United States Patent
Giffard-Burley

(10) Patent No.: US 11,601,286 B2
(45) Date of Patent: Mar. 7, 2023

(54) SIGNATURE VERIFICATION PLATFORM

(71) Applicant: Wacom Co., Ltd., Saitama (JP)

(72) Inventor: Joss Daniel Giffard-Burley, Frome (GB)

(73) Assignee: Wacom Co., Ltd., Saitama (JP)

( * ) Notice: Subject to any disclaimer, the term of this patent is extended or adjusted under 35 U.S.C. 154(b) by 302 days.

(21) Appl. No.: 16/997,538

(22) Filed: Aug. 19, 2020

(65) Prior Publication Data

US 2021/0075625 A1     Mar. 11, 2021

(30) Foreign Application Priority Data

Sep. 11, 2019  (JP) .............................. JP2019-165655

(51) Int. Cl.
*H04L 9/32*   (2006.01)
*G06N 20/00*  (2019.01)

(52) U.S. Cl.
CPC ........... *H04L 9/3247* (2013.01); *G06N 20/00* (2019.01)

(58) Field of Classification Search
CPC ............. G06F 21/32; G06F 2221/0737; G06F 2221/074; H04W 12/68; H04L 2209/72; H04L 2209/68; H04L 9/0866
See application file for complete search history.

(56) References Cited

U.S. PATENT DOCUMENTS

| | | | | |
|---|---|---|---|---|
| 8,108,764 B2* | 1/2012 | Berard | .................. | G06V 30/40 382/175 |
| 10,402,163 B2* | 9/2019 | Ghatage | ................... | G06F 7/02 |
| 2009/0092320 A1* | 4/2009 | Berard | .................. | G06V 30/40 382/209 |

FOREIGN PATENT DOCUMENTS

JP          2016-95666 A       5/2016

OTHER PUBLICATIONS

Graves, "Generating Sequences With Recurrent Neural Networks," Department of Computer Science, University of Toronto, Jun. 5, 2014, 43 pages.

* cited by examiner

*Primary Examiner* — Jeffrey C Pwu
*Assistant Examiner* — Paul J Skwierawski
(74) *Attorney, Agent, or Firm* — Seed IP Law Group LLP

(57) ABSTRACT

A signature verification platform includes: a locale classifying engine configured to decide a style of a signature by applying machine learning-based classification techniques to the signature that is input to the locale classifying engine; a parameter profile generating section configured to select a verification profile which suits the style decided by the locale classifying engine; and a verification engine configured to verify the signature using the verification profile selected by the parameter profile generating section.

7 Claims, 6 Drawing Sheets

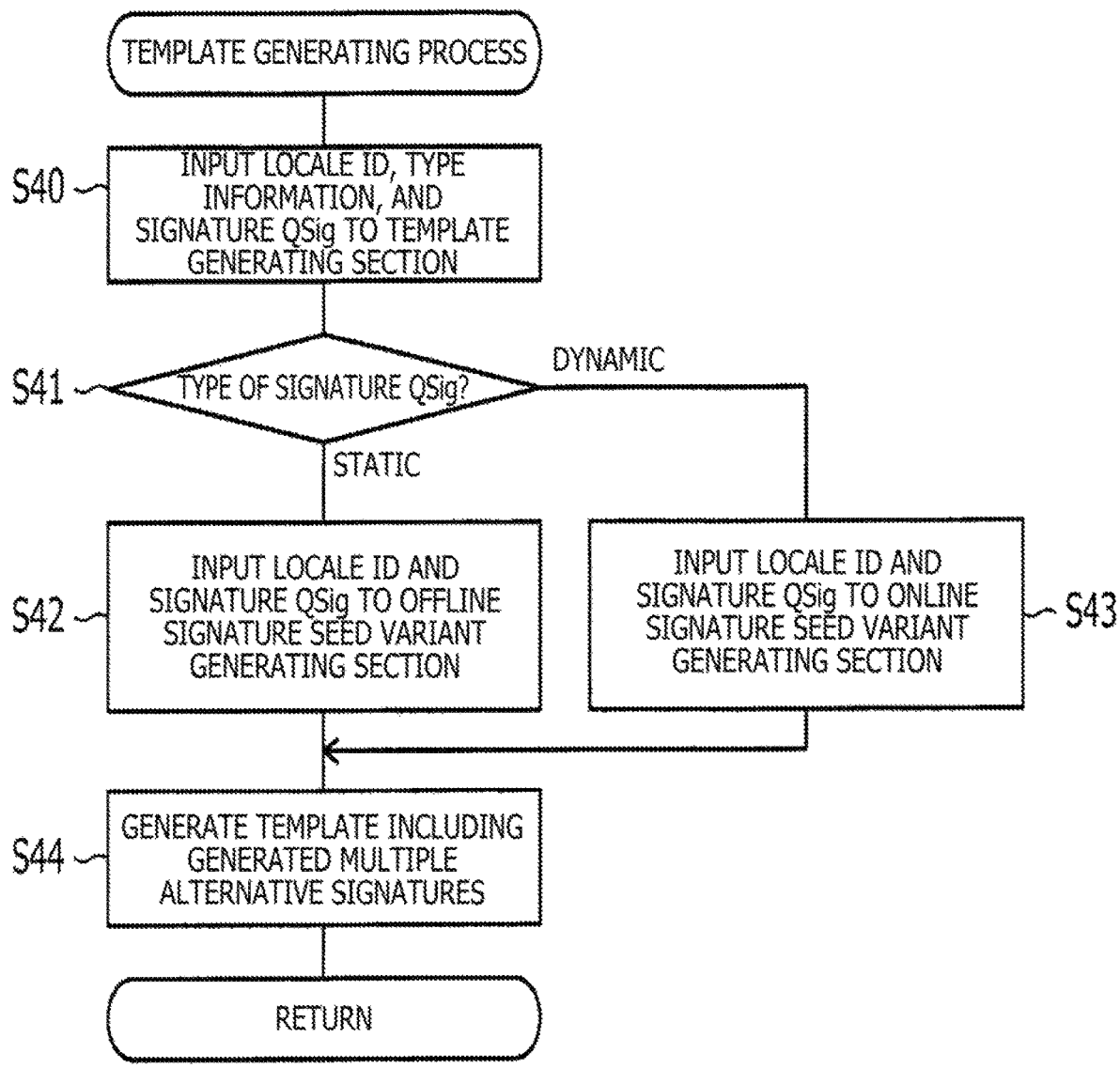

SIGNATURE VERIFICATION PLATFORM

BACKGROUND

Technical Field

The present disclosure relates to a touch controller and a pen input system.

Description of the Related Art

Signature verification platforms are known that allow numerous parameters to be adjusted with respect to specific signature sets in a manner so as to improve verification rates (false acceptance rate (FAR)/false rejection rate (FRR)) for the signature sets (e.g., see Japanese Patent Laid-Open No. 2016-095666). These parameters are adjusted to achieve the best verification rates based on test signature data. The test signature data typically includes various signatures of subjects residing in Europe, Asia, etc.

Also known are recursive neural networks (RNN), which are neural networks capable of handling time sequential data. A technology for synthesizing diverse and realistic samples of handwriting data using recursive neural networks is disclosed by Alex Graves in "Generating Sequences With Recurrent Neural Networks," [online], Jun. 5, 2014, Department of Computer Science of University of Toronto, [searched on Sep. 8, 2019], Internet <URL: https://arxiv.org/pdf/1308.0850v5.pdf/>.

When the signature verification platforms are expanded in the real working environment, each of the parameters may be adjusted to suit particular user locales. For example, the parameters may be adjusted to suit Asian style signatures for banks in the Asia-Pacific region, or the parameters for static image cleanup may be adjusted (tuned) so that scanned images can be precisely processed by a system. In view of the global expansion of the signature verification platforms, a general set of parameters need to be selected to maximize the verification accuracy in multiple regions and, therefore, it may be difficult to achieve the best verification rate at each region or locale.

With the recent introduction of template-based GSV (generic signature verification) technology (technology for supporting verification using both raster data and stroke data), it has become possible for systems to collect sufficient data from a set of users and generate signature profiles of the users that define the distinct variation characteristics of the users' signatures, to thereby improve the verification rates for the users. The verification rates (FAR/FRR) of these systems, however, remain the same as those of conventional systems until the signature profiles can be generated after a considerable number of registration sessions have been conducted.

BRIEF SUMMARY

According to one aspect of the present disclosure, a signature verification platform is provided, which improves the verification rates quickly upon global expansion by adopting a new verification pipeline incorporating an AI/machine learning-based system.

According to one aspect, a signature verification platform includes: a locale classifying engine configured to decide a style of a signature by applying machine learning-based classification techniques to the signature that is input to the locale classifying engine; a parameter profile generating section configured to select a verification profile which best suits the style decided by the locale classifying engine; and a verification engine configured to verify the signature using the verification profile selected by the parameter profile generating section.

The signature verification platform according to another aspect may further include a signature seed variant generating section configured to generate, based on the style decided by the locale classifying engine, multiple alternative signatures of the signature. The signature verification platform may also include a template generating section configured to generate a template using the multiple alternative signatures generated by the signature seed variant generating section. The verification engine may verify the signature using the template generated by the template generating section.

According to one aspect, a method is provided including the steps of: deciding a style of a signature by applying machine learning-based classification techniques to the signature that is input; selecting a verification profile which best suits the decided style; and verifying the signature using the selected verification profile.

The method according to another aspect may further include the steps of: generating multiple alternative signatures of the signature based on the decided style; and generating a template using the generated multiple alternative signatures. The verifying step may verify the signature using the generated template.

Thus, according to the present disclosure, it is possible to improve the verification rates quickly in globally expanding the signature verification platform.

BRIEF DESCRIPTION OF THE SEVERAL VIEWS OF THE DRAWINGS

FIG. 7 is a flowchart of a template generating process in step S6 of FIG. 5.

DETAILED DESCRIPTION

Figure 1:
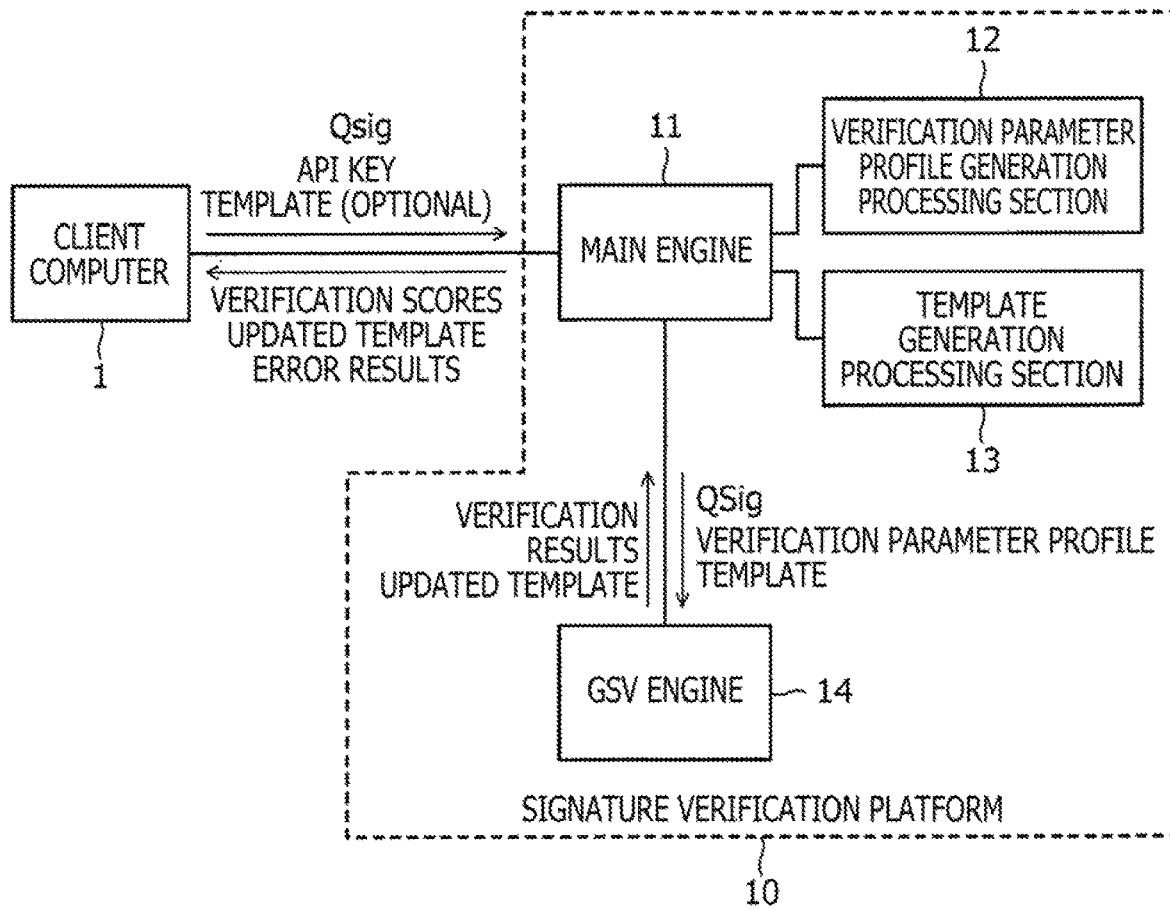
FIG. 1 is a block diagram depicting a configuration of a signature verification platform according to one embodiment.

FIG. 1 is a block diagram depicting a configuration of a signature verification platform 10 according to one embodiment. The signature verification platform 10 is an apparatus that verifies the validity of a signature QSig supplied from a client computer 1. The client computer 1 may be a server computer of a bank, for example. The client computer 1 transmits to the signature verification platform 10 the signature QSig written in a signature block of a document submitted by a user. The signature verification platform 10 verifies the validity of the signature QSig transmitted from the client computer 1, and returns the verification result to the client computer 1. Based on the returned result of the verification, the client computer 1 performs the process of determining whether the signature QSig is valid.

The signatures QSig may include static signatures and dynamic signatures. A static signature QSig is raster data formed of an image file, such as Joint Photographic Experts Group (JPEG) files and bitmap image (BMP) files. A typical static signature QSig is generated by a scanner reading the signature written with a ballpoint pen on a paper medium, for example. A dynamic signature QSig, on the other hand, is data formed of digital ink including stroke data generated by pen input.

Figure 2:
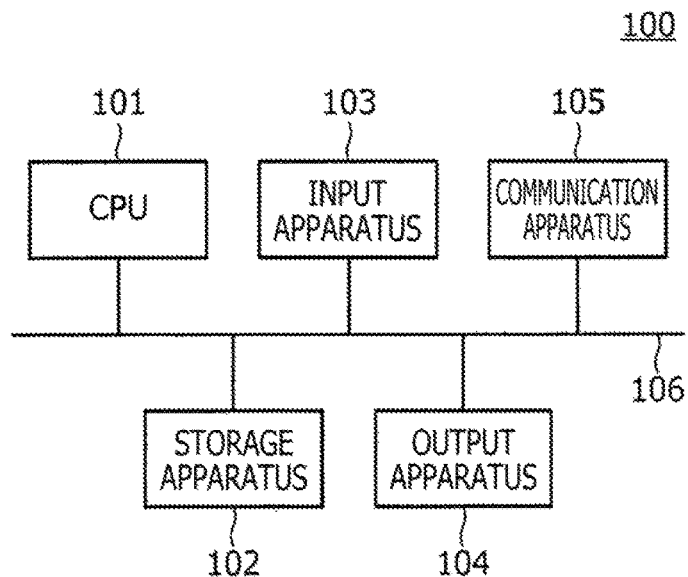
FIG. 2 is a lock diagram depicting a typical hardware configuration of a client computer and the signature verification platform.

FIG. 2 is a block diagram depicting a typical hardware configuration of the client computer 1 and the signature verification platform 10. The client computer 1 and the signature verification platform 10 may each be constituted by a computer 100 configured as depicted in FIG. 2. While FIG. 2 indicates one computer 100, the client computer 1 and the signature verification platform 10 may each be configured with multiple computers 100 linked with each other. Alternatively, the client computer 1 and the signature verification platform 10 may be configured within the same computer 100. In this case, the computer 100 may be a personal computer or a mobile device, such as a smartphone for example.

As depicted in FIG. 2, the computer 100 includes a central processing unit (CPU) 101, a storage apparatus 102, an input apparatus 103, an output apparatus 104, and a communication apparatus 105.

The CPU 101 is an apparatus that controls the components of the computer 100, retrieves various programs from the storage apparatus 102, and performs the programs thus retrieved. Diverse functional sections (to be described later in detail) of the signature verification platform 10 are implemented by the CPU 101 of the signature verification platform 10 executing the programs stored in the storage apparatus 102.

The storage apparatus 102 includes a main storage device such as a dynamic random access memory (DRAM) and an auxiliary storage device such as a hard disk. The storage apparatus 102 serves to store an operating system of the computer 100, various programs for executing diverse applications, and data for use by these programs.

The input apparatus 103 is an apparatus that supplies the CPU 101 with input operations performed by the user. For example, the input apparatus 103 includes a keyboard, a mouse, and a touch controller (a device for detecting pen input or touch input). The output apparatus 104 is an apparatus that outputs the result of the processing by the CPU 101 to the user. For example, the output apparatus 104 includes a display unit and speakers. The communication apparatus 105 is an apparatus that communicates with external apparatuses. Pursuant to instructions from the CPU 101, the communication apparatus 105 transmits and receives data to and from the outside. Data transmission and reception between the client computer 1 and the signature verification platform 10 are carried out by their respective communication apparatuses 105 communicating with each other.

Returning to FIG. 1, the signature verification platform 10 is functionally configured with a main engine 11, a verification parameter profile generation processing section 12, a template generation processing section 13, and a GSV (generic signature verification) engine 14. As used herein, GSV means "generic" signature verification including both static signature verification and dynamic signature verification.

The main engine 11 functions as an interface with the client computer 1. The main engine 11 verifies the signature QSig using the verification parameter profile generation processing section 12, template generation processing section 13, and GSV engine 14.

The main engine 11 interfacing with the client computer 1 serves to issue an application programming interface (API) key to the client computer 1. The client computer 1 stores the API key and, upon requesting verification of a signature QSig, transmits the API key together with the signature QSig to the signature verification platform 10. The main engine 11 determines whether or not the API key received along with the signature QSig matches the previously issued key. In the event of a mismatch, the main engine 11 returns an error to the client computer 1. In this case, the signature QSig is not verified.

On the other hand, in the case where the API key matches the previously issued key, the main engine 11 supplies the signature QSig to the verification parameter profile generation processing section 12. The verification parameter profile generation processing section 12 is a functional section that generates a verification parameter profile based on the supplied signature QSig and supplies the generated verification parameter profile to the main engine 11. As will be described later in detail, the verification parameter profile is data that includes a locale identification (ID) indicative of the style of the signature QSig (e.g., whether the signature QSig is Asian style (i.e., written in Chinese character) or European style (written in Latin characters)). The verification parameter profile may also include a verification profile indicative of tolerances for verifying the signature QSig, type information identifying whether the signature QSig is static or dynamic, and a clean profile used for removing artifacts (lines, smudges, etc., other than the signature in the image).

The verification parameter profile generation processing section 12 serves to decide the style of the signature QSig through application of machine learning-based classification techniques to the signature QSig and to select the verification profile which best matches (suits) the style thus decided, thereby optimizing the parameters to be supplied to the GSV engine 14. The processing involved will be described later with reference to FIG. 3.

The main engine 11 performs the process of supplying the template generation processing section 13 with the signature QSig and the type information and locale ID generated by the verification parameter profile generation processing section 12. The template generation processing section 13 is a functional section that generates a template for verifying the signature QSig and supplies the generated template to the main engine 11.

What follows is a general explanation of the template. In a case where the signature QSig of a given user is to be verified for the first time, the client computer 1 has no template regarding the user. In this case, the client computer 1 transmits the signature QSig and API key alone to the signature verification platform 10. The signature verification platform 10 in turn generates a template for the user based on the signature QSig thus acquired, and supplies the generated template to the client computer 1. The client computer 1 stores the template acquired from the signature verification platform 10. Thereafter, whenever requesting the verification of the signature QSig, the client computer 1 transmits the template along with the signature QSig and API key. In the case where the template is transmitted in this manner, the signature verification platform 10 compares the template with the signature QSig, to verify the signature QSig.

The template generation processing section 13 may regard the signature QSig itself as a template when the signature QSig is transmitted without a template. Also, the template generation processing section 13 may perform the process of generating multiple alternative signatures of the signature QSig based on the style of the signature QSig and generating the template using the multiple alternative signatures thus generated. The multiple alternative signatures are generated using a recursive neural network that adopts generation models which accommodates average variations of the style of signatures QSig. The process will be explained later in detail with reference to FIG. 4.

In order to perform verification of the signature QSig, the main engine 11 supplies the GSV engine 14 with the signature QSig, with the verification parameter profile generated by the verification parameter profile generation processing section 12, and with the template generated by the template generation processing section 13. The GSV engine 14 is a verification engine that verifies the signature QSig based on the GSV technology. Specifically, using the verification parameter profile supplied from the main engine 11, the GSV engine 14 calculates as a verification score the likelihood (of one corresponding to the other) between the signature QSig and each of the signatures included in the template. Based on the verification score thus obtained, the GSV engine 14 verifies the signature QSig. If the verification score is equal to or higher than a predetermined value (i.e., verification OK), the verification score becomes the verification result. If the verification score is lower than the predetermined value (i.e., verification NG), an error is recognized as the verification result. The GSV engine 14 also performs the process of updating the template based on the verification result.

The main engine 11 receives from the GSV engine 14 the verification result (the verification score or an error) and the updated template, and returns what is received to the client computer 1. This allows the client computer 1 to know the verification result of the signature QSig. Because the verification score is returned in the case where the signature verification platform 10 has determined that the verification result is OK, the client computer 1 may itself evaluate the verification result in accordance with its own stricter criteria than the criteria used by the signature verification platform 10.

The client computer 1 stores the template returned from the signature verification platform 10. Next time the client computer 1 accepts input of a signature from the same user, the client computer 1 transmits the stored template together with the input signature QSig to the signature verification platform 10.

Figure 3:
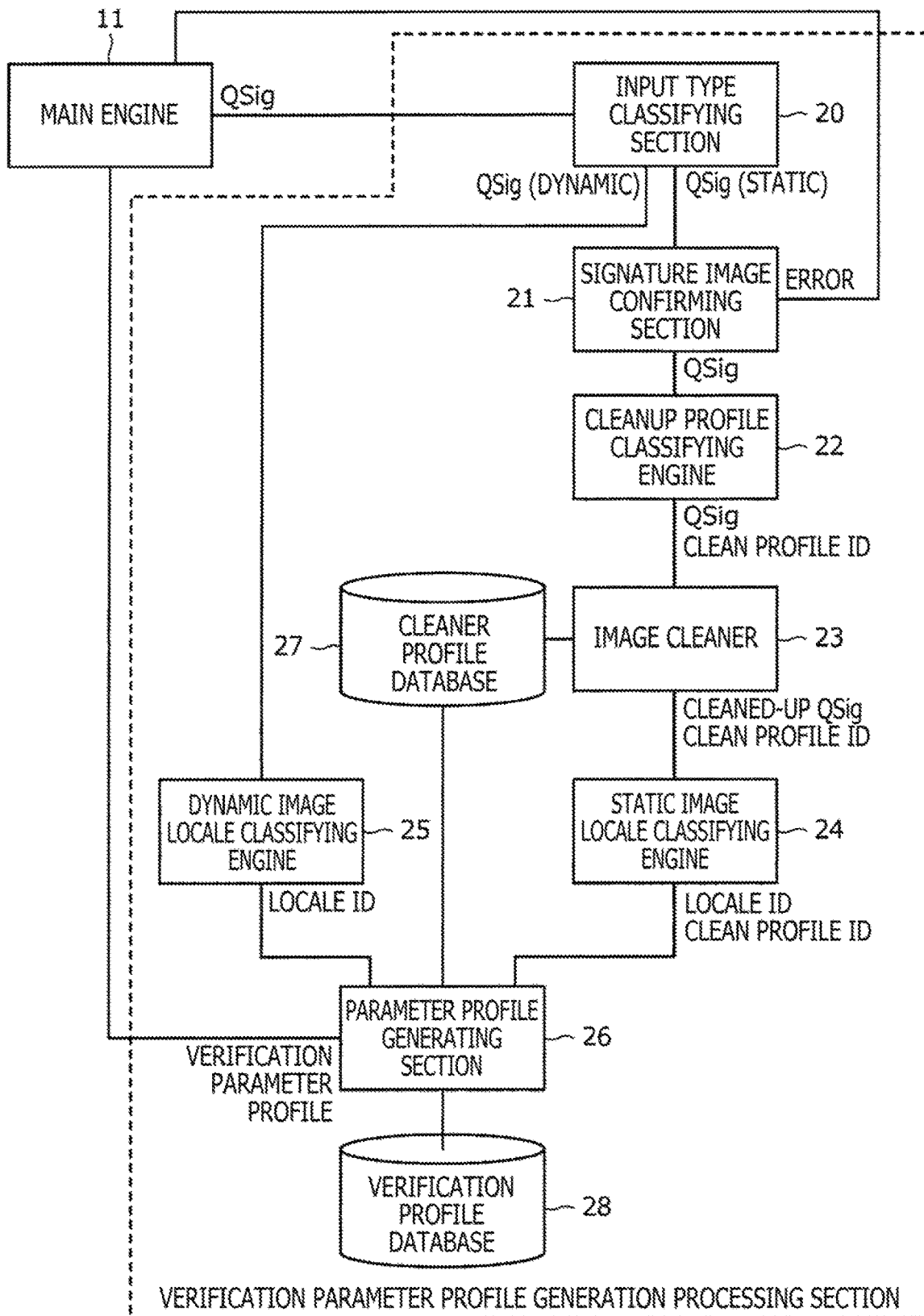
FIG. 3 is a block diagram depicting a detailed configuration of a verification parameter profile generation processing section.

FIG. 3 is a block diagram depicting a detailed configuration of the verification parameter profile generation processing section 12. As depicted in FIG. 3, the verification parameter profile generation processing section 12 includes an input type classifying section 20, a signature image confirming section 21, a cleanup profile classifying engine 22, an image cleaner 23, a static image locale classifying engine 24, a dynamic image locale classifying engine 25, a parameter profile generating section 26, a cleaner profile database 27, and a verification profile database 28.

The signature QSig supplied from the main engine 11 to the verification parameter profile generation processing section 12 is first input to the input type classifying section 20. The input type classifying section 20 determines whether the input signature QSig is static or dynamic. If the input signature QSig is static, the input type classifying section 20 supplies the signature QSig to the signature image confirming section 21. If the input signature QSig is dynamic, the input type classifying section 20 supplies the signature QSig to the dynamic image locale classifying engine 25.

The signature image confirming section 21 performs the process of confirming whether or not the signature QSig is likely to be an image that includes an signature. Specifically, the signature image confirming section 21 inputs the signature QSig to a machine learning-based system (e.g., neural network), which has beforehand learned examples of images including signatures and examples of images not including signatures, and based on a resulting score output from the machine leaning-based system, determines whether or not the signature QSig is likely to be an image including a signature. In the case where the signature QSig is determined not to be an image that includes a signature, the signature image confirming section 21 returns an error to the main engine 11. In this case, the main engine 11 returns an error to the client computer 1 and performs no further processing on the verification of the signature QSig. Conversely, upon determining that the signature QSig is an image that includes a signature, the signature image confirming section 21 supplies the signature QSig to the cleanup profile classifying engine 22.

The cleanup profile classifying engine 22 is a functional section that selects a cleanup profile which suits the signature QSig. Specifically, the cleanup profile classifying engine 22 inputs the signature QSig to a machine learning-based system (e.g., neural network), which has beforehand learned images including signatures and clean profiles which suit these images, and based on a resulting score of each of the clean profiles output from the machine leaning-based system, selects the clean profile which best suits the signature QSig. The clean profile which best suits the signature QSig means the clean profile that most effectively removes artifacts from the signature QSig. The cleanup profile classifying engine 22 supplies the image cleaner 23 with the clean profile ID identifying the selected clean profile together with the signature QSig.

The cleaner profile database 27 is a database that stores the clean profiles of all types in association with their respective clean profile IDs. The image cleaner 23 reads the clean profile from the cleaner profile database 27 based on the clean profile ID supplied from the cleanup profile classifying engine 22 and, using the retrieved clean profile, performs the process of cleaning up the signature QSig supplied from the cleanup profile classifying engine 22. The process removes the artifacts from the signature QSig. The image cleaner 23 supplies the static image locale classifying engine 24 with the cleaned-up signature QSig together with the clean profile ID supplied from the cleanup profile classifying engine 22.

The static image locale classifying engine 24 is a functional section that decides the style of a given signature QSig by applying machine learning-based classification techniques to the signature QSig. Specifically, the static image locale classifying engine 24 inputs the cleaned-up QSig to a machine learning-based classifying system (e.g., neural network), which has beforehand learned multiple static signatures and the styles of these signatures, and based on a resulting score of each of the styles output from the machine leaning-based classifying system, selects the style which best suits the signature QSig. The static image locale classifying engine 24 then supplies the parameter profile generating section 26 with the locale ID identifying the selected style together with the clean profile ID supplied from the image cleaner 23.

The dynamic image locale classifying engine 25 is a functional section that decides the style of a given dynamic signature QSig by applying machine learning-based classification techniques to the signature QSig. Specifically, the dynamic image locale classifying engine 25 inputs the signature QSig to a machine learning-based classifying system (e.g., neural network), which has beforehand learned multiple dynamic signatures and the styles which suit these signatures, and based on a resulting score of each of the styles output from the machine leaning-based classifying system, selects the style which best suits the signature QSig. The dynamic image locale classifying engine 25 then supplies the locale ID indicating the selected style to the parameter profile generating section 26.

Any suitable classifying system may be utilized as the classifying system included in both the static image locale classifying engine 24 and the dynamic image locale classifying engine 25. For example, any one of linear classifiers, logistic regression systems, naive Bayes classifiers, support vector machines, decision tree systems, boosted tree systems, random forest systems, neural networks, and nearest neighbor systems may be used as the classifying system included in both the static image locale classifying engine 24 and the dynamic image locale classifying engine 25.

The parameter profile generating section 26 is a functional section that selects the verification profile which best suits the locale ID supplied from the static image locale classifying engine 24 or from the dynamic image locale classifying engine 25. Given a static signature QSig, the parameter profile generating section 26 selects the verification profile based on the clean profile ID. Generally, the degree and content of tolerances for signature verification exhibit different tendencies depending on the style of the signature, and on the clean profile in the case of static signatures. Thus, selecting the verification profile in the manner described above makes it possible to select the verification profile which best suits the signature QSig.

Below is a more specific explanation of the processing by the parameter profile generating section 26. Given a static signature QSig, first, the parameter profile generating section 26 inputs a locale ID and a clean profile ID in combination to a machine learning-based system (e.g., neural network), which has beforehand learned combinations of locale IDs and clean profile IDs as well as verification profiles which suit these combinations, and based on a resulting score of each of the verification profiles output from the machine leaning-based system, selects the verification profile to be used for the verification. Given a dynamic signature QSig, the parameter profile generating section 26 inputs the locale ID to a machine learning-based system (e.g., neural network), which has beforehand learned locale IDs and verification profiles which suit these locale IDs, and based on a resulting score of each of the verification profiles output from the machine leaning-based system, selects the verification profile to be used for the verification.

The verification profile database 28 is a database that stores the verification profiles of all types. The parameter profile generating section 26 retrieves the selected verification profile from the verification profile database 28, and supplies the main engine 11 with the retrieved verification profile as part of the verification parameter profile. At this point, the parameter profile generating section 26 inserts, into the verification parameter profile, the above-mentioned type information identifying whether the signature QSig is static or dynamic together with the locale ID and the clean profile ID (only if the signature QSig is static).

Figure 4:
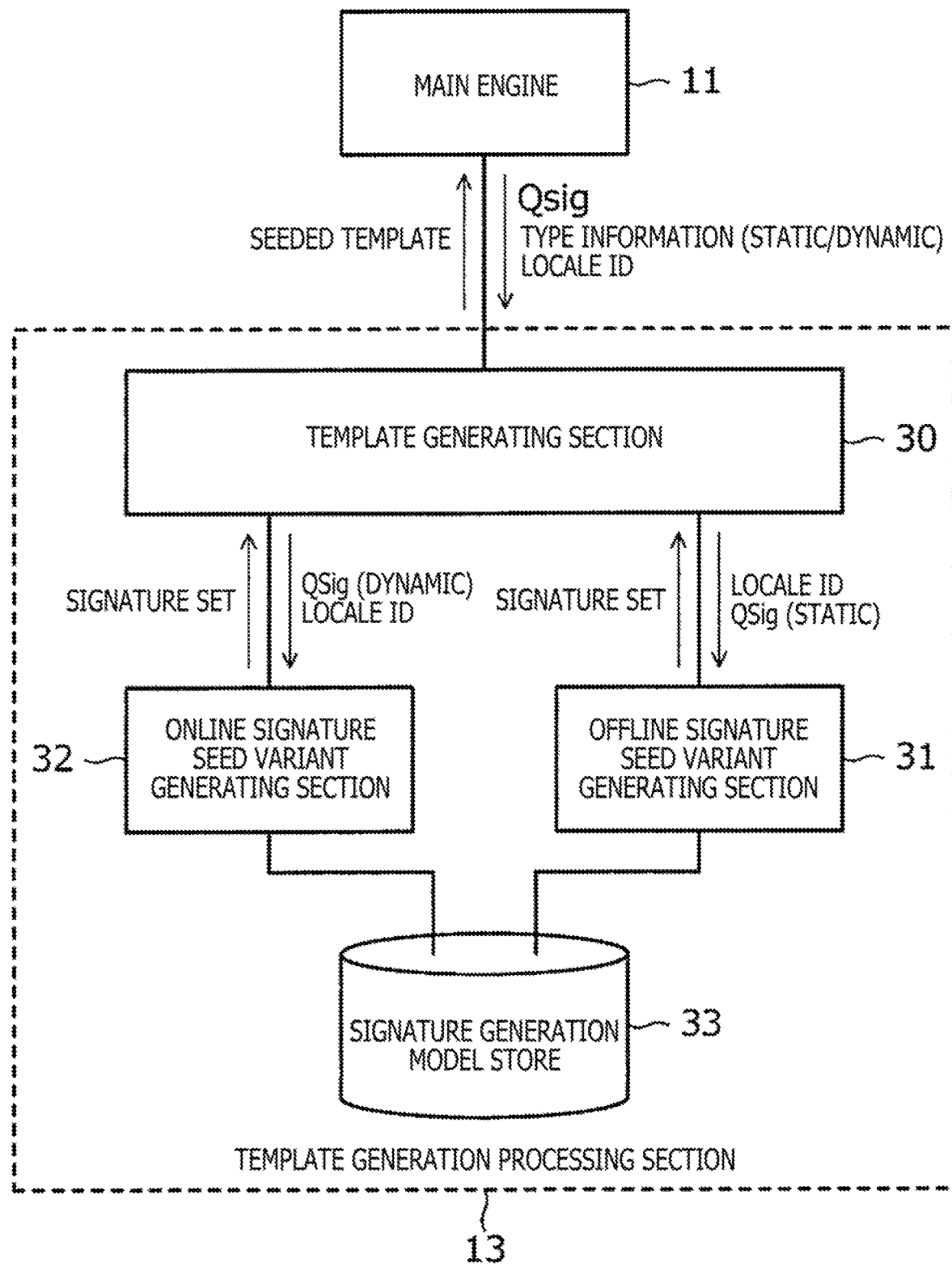
FIG. 4 is a block diagram depicting a detailed configuration of a template generation processing section.

FIG. 4 is a block diagram depicting a detailed configuration of the template generation processing section 13. As depicted in FIG. 4, the template generation processing section 13 includes a template generating section 30, an offline signature seed variant generating section 31, an online signature seed variant generating section 32, and a signature generation model store 33.

The signature QSig, type information, and locale ID supplied from the main engine 11 to the template generation processing section 13 are first input to the template generating section 30. In a case where the type information indicates that the signature QSig is static, the template generating section 30 supplies the signature QSig and the locale ID to the offline signature seed variant generating section 31. On the other hand, in a case where the type information indicates that the signature QSig is dynamic, the template generating section 30 supplies the signature QSig and the locale ID to the online signature seed variant generating section 32.

The offline signature seed variant generating section 31 is a functional section that, given a static signature QSig, generates multiple alternative signatures obtained by applying an average variation (handwriting wobbling) of the style of the signature QSig to the signature QSig. Generally, the degree and details of handwriting wobbling exhibit different tendencies depending on the style of the signature. Thus, generating multiple alternative signatures in the manner described above makes it possible to generate the multiple alternative signatures which best suit the signature QSig.

The online signature seed variant generating section 32 is a functional section that, given a dynamic signature QSig, generates multiple alternative signatures obtained by applying an average variation (handwriting wobbling) of the style of the signature QSig to the signature QSig. As with the offline signature seed variant generating section 31, the online signature seed variant generating section 32 can also generate the multiple alternative signatures which best suit the signature QSig.

Below is a more specific explanation of the offline signature seed variant generating section 31 and the online signature seed variant generating section 32. The signature generation model store 33 stores a signature generation model, which accommodates average variations with respect to each of the combinations of types and styles of signatures. The offline signature seed variant generating section 31 and the online signature seed variant generating section 32 each retrieve from the signature generation model store 33 the generation model corresponding to the type and style of the signature QSig and, using a recurrent neural network that uses the retrieved generation model and the signature QSig, generate multiple reasonable alternative signatures to the signature QSig. The reason for using the recurrent neural network is that adding the suitable alternative signatures to the template helps improve the verification rates (FAR/FRR) with regard to the input signature QSig.

The offline signature seed variant generating section 31 and the online signature seed variant generating section 32 each supply a signature set including the generated multiple alternative signatures to the template generating section 30. Using the signature set thus supplied, the template generating section 30 generates a template seeded with the alternative signatures (i.e., a template including the signature QSig and its alternatives) and supplies the generated template to the main engine 11.

Figure 5:
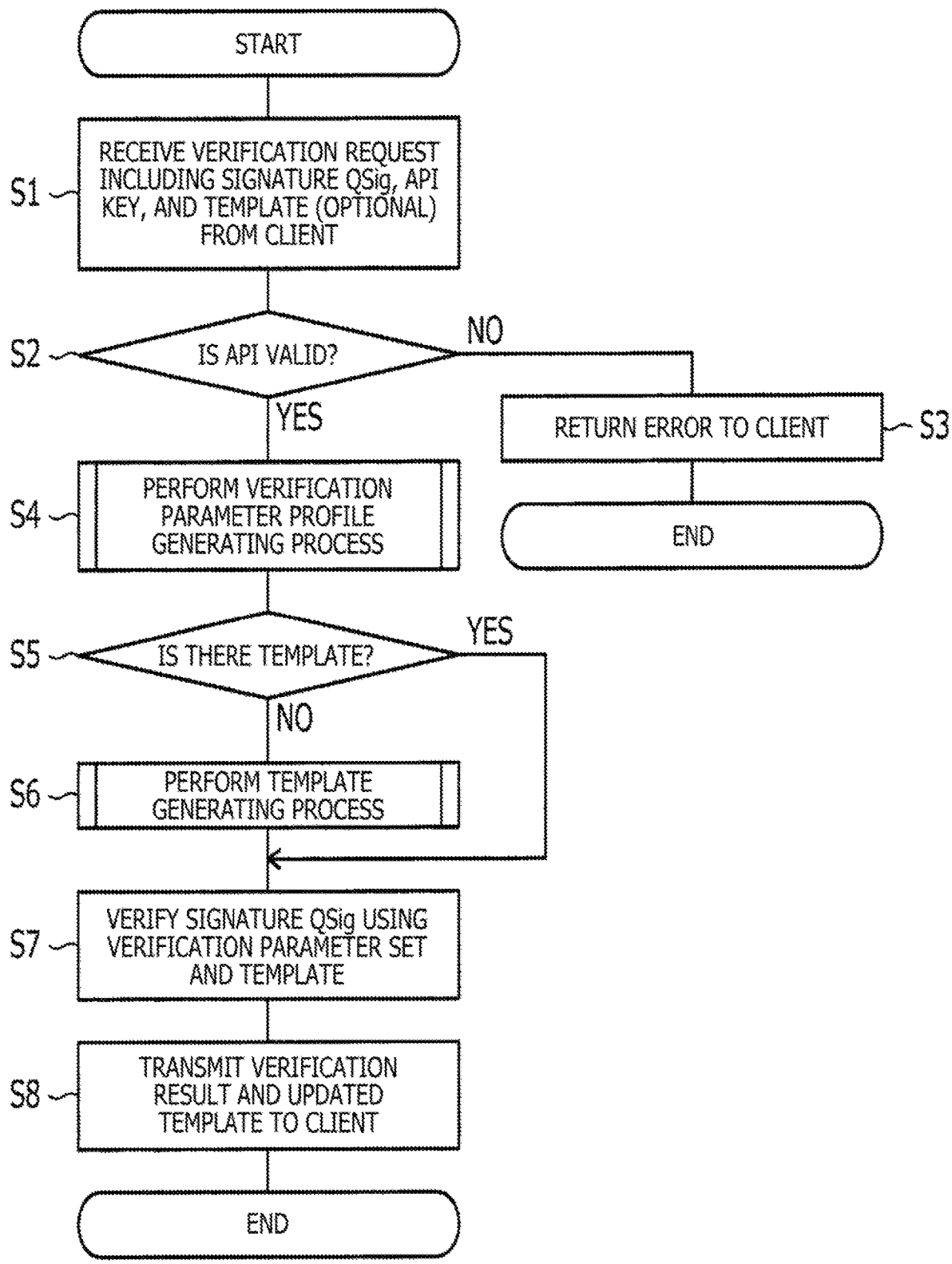
FIG. 5 is a flowchart of processing performed by the signature verification platform.
Figure 6:
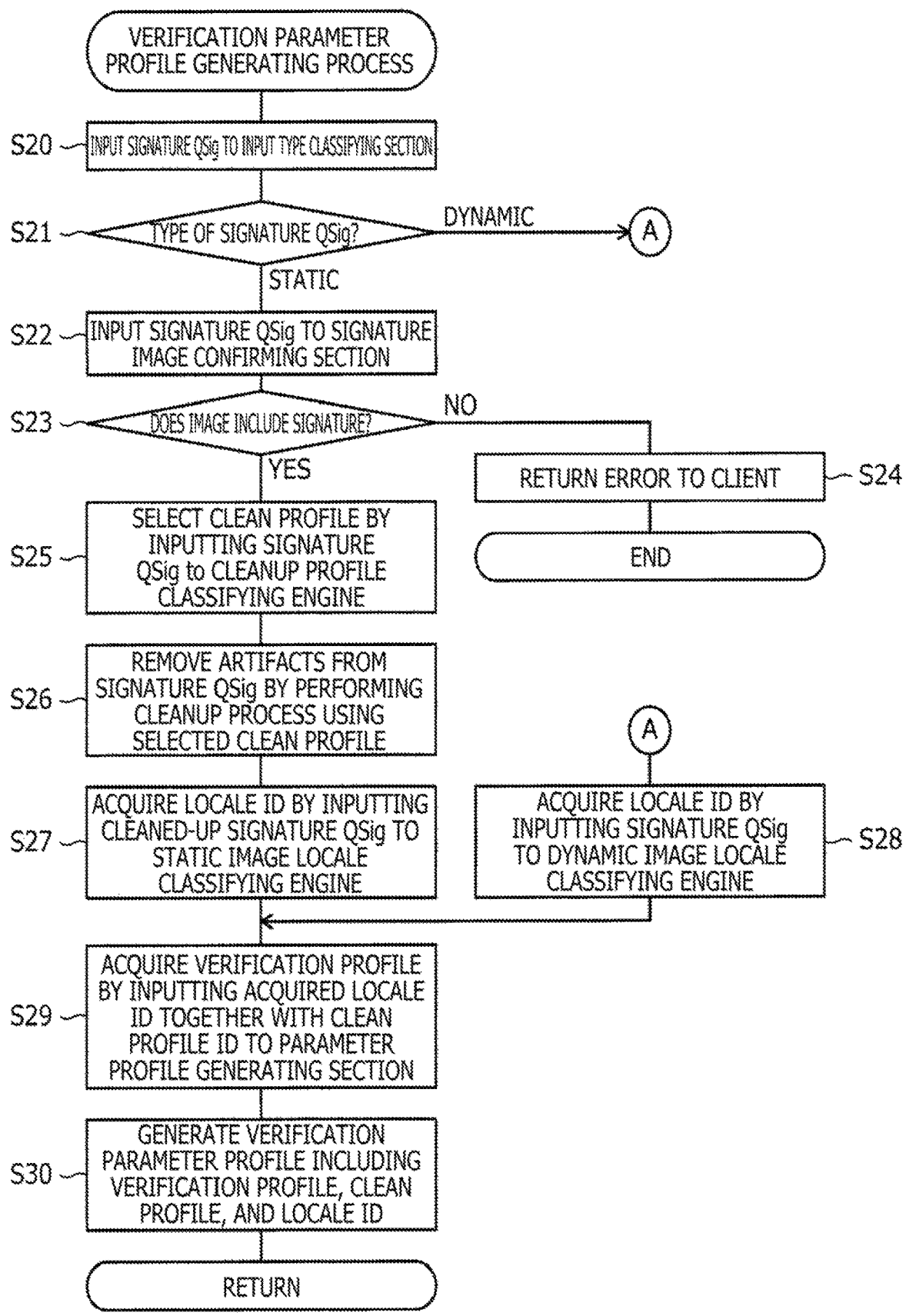
FIG. 6 is a flowchart of a verification parameter profile generating process in step S4 of FIG. 5.

FIGS. 5 to 7 are flowcharts depicting processes performed by the signature verification platform 10. FIG. 5 depicts the process performed by the main engine 11 and the GSV engine 14. FIG. 6 indicates the process carried out by the verification parameter profile generation processing section 12. FIG. 7 presents the process executed by the template generation processing section 13. Below is another detailed explanation of the workings of the signature verification platform 10 from a different point of view with reference to these flowcharts.

As depicted in FIG. 5, the main engine 11 first receives from the client computer 1 a verification request including a signature QSig and an API key (step S1). In a case where the client computer 1 already retains a template, the verification request includes the template.

Next, the main engine 11 determines whether or not the received API key is valid (step 2). If the API key is not valid, the main engine 11 returns an error to the client computer 1 and terminates the process (step S3). If the API key is valid, the main engine 11 causes the verification parameter profile generation processing section 12 to perform a verification parameter profile generating process (step S4).

FIG. 6 is a flowchart of the verification parameter profile generating process. Below is a detailed explanation of the verification parameter profile generating process with additional reference to FIG. 3.

First, the verification parameter profile generation processing section 12 inputs the signature QSig to the input type classifying section 20. In a case where the input type classifying section 20 determines that the input signature QSig is static (step S21), the verification parameter profile generation processing section 12 inputs the signature QSig to the signature image confirming section 21 (step S22). In a case where the signature image confirming section 21 determines that the input signature QSig is not an image that includes a signature (step S23), the verification parameter profile generation processing section 12 returns an error to the client computer 1 via the main engine 11 (step S24) and terminates the process of verifying the signature QSig at this point. Conversely, if the input signature QSig is an image that includes a signature, the verification parameter profile generation processing section 12 selects the clean profile by inputting the signature QSig to the cleanup profile classifying engine 22 (step S25). The verification parameter profile generation processing section 12 then performs a cleanup process using the selected clean profile to remove artifacts from the signature QSig (step S26). Thereafter, the verification parameter profile generation processing section 12 inputs the cleaned-up signature QSig to the static image locale classifying engine 24, thereby acquiring the locale ID identifying the style of the signature QSig (step S27).

In a case where the input type classifying section 20 determines that the input signature QSig is dynamic (step S21), the verification parameter profile generation processing section 12 inputs the signature QSig to the dynamic image locale classifying engine 25, thereby acquiring the locale ID indicating the locale of the signature QSig (step S28).

Upon completing step S27 or step S28, the verification parameter profile generation processing section 12 acquires the verification profile by inputting the obtained locale ID together with the clean profile ID to the parameter profile generating section 26 (step S29). The verification parameter profile generation processing section 12 then generates a verification parameter profile that includes the acquired verification profile, clean profile and locale ID, outputs the generated parameter profile to the main engine 11 (step S30), and terminates the process.

Returning to FIG. 5, after step S4, the main engine 11 determines whether or not there is a template (step S5). The result of this determination is positive if the template has been received in step S1 and negative if the template has not been received. In the case where the result of the determination in step S5 is negative, the main engine 11 causes the template generation processing section 13 to perform a template generating process (step S6).

FIG. 7 is a flowchart of the template generating process. Below is a detailed explanation of the template generating process with additional reference to FIG. 4.

First, the template generation processing section 13 inputs the locale ID, type information, and signature QSig (the signature, if static, is to be cleaned up beforehand by the image cleaner 23) to the template generating section 30 (step S40). The template generating section 30 determines the type of the signature QSig by referencing the input type information (step S41). If the type information is determined to be the static type, the template generating section 30 inputs the locale ID and the signature QSig to the offline signature seed variant generating section 31 (step S42). If the type information is determined to be the dynamic type, the template generating section 30 inputs the locale ID and the signature QSig to the online signature seed variant generating section 32 (step S43). The template generating section 30 thus obtains the template including multiple alternative signatures generated by the offline signature seed variant generating section 31 or by the online signature seed variant generating section 32, outputs the generated template to the main engine 11 (step S44), and terminates the process.

Returning to FIG. 5, the main engine 11 then verifies the signature QSig using the GSV engine 14 (step S7). At this point, the GSV engine 14 performs the verification using the verification parameter profile and the template. The verification parameter profile generated by the verification parameter profile generating process in step S4 is used. In a case where a template is generated by the template generating process in step S6, the generated template is used, while in a case where no template is generated, the template received in step S1 is used. The verifying process in step S7 includes a template updating process.

Upon completion of the process in step S7, the main engine 11 transmits the verification result of the signature QSig and the updated template to the client computer 1 (step S8), and terminates the series of the processes.

As described above, the signature verification platform 10 of this embodiment decides the style of the input signature QSig and verifies the signature QSig using the verification profile which suits the decided style. Thus, this makes it possible to rapidly improve the verification rates in globally expanding the signature verification platform.

Because the verification is performed using the template that includes multiple alternative signatures generated based on the generation model, which accommodates the average variation of the style of the signature QSig, the verification rates can be further improved upon global expansion of the signature verification platform.

The present disclosure is not limited to the embodiment described above. It is obvious that the described embodiment may be varied or modified diversely based on the present disclosure.

For example, the signature verification platform 10 may be configured to incorporate a repository for storing the results of the processes. Such a repository may store, for example, the results of the processes performed by the signature image confirming section 21, by the cleanup profile classifying engine 22, by the static image locale classifying engine 24, and by the dynamic image locale classifying engine 25 in association with the input signatures QSig. This configuration allows a human operator to manually verify the results in the repository and to adjust the processes of the functional sections involved as needed, which further improves the verification rates.

What is claimed is:

1. A signature verification platform, comprising:
    a locale classifying engine configured to decide a style of a signature by applying machine learning-based classification techniques to the signature that is input to the locale classifying engine;
    a parameter profile generating section configured to select a verification profile which suits the style decided by the locale classifying engine; and
    a verification engine configured to verify the signature using the verification profile selected by the parameter profile generating section.

2. The signature verification platform according to claim 1, wherein the locale classifying engine decides the style of the signature based on a score of each of the styles obtained by inputting the signature to a machine learning-based classifying system, which has beforehand learned a plurality of signatures and the style of each of the signatures.

3. The signature verification platform according to claim 1, further comprising:
    a signature seed variant generating section configured to generate, based on the style decided by the locale classifying engine, a plurality of alternative signatures obtained by applying an average variation of the style of the signature to the signature; and
    a template generating section configured to generate a template using the alternative signatures generated by the signature seed variant generating section,
    wherein the verification engine verifies the signature using the template generated by the template generating section.

4. The signature verification platform according to claim 3, wherein the signature seed variant generating section generates the plurality of alternative signatures using a recurrent neural network that uses a generation model which accommodates an average variation of the style decided by the locale classifying engine and the signature.

5. The signature verification platform according to claim 1, wherein the signature is a static signature, and the signature verification platform further comprises:
    a cleanup profile classifying engine configured to select a clean profile which suits the signature; and
    an image cleaner configured to remove artifacts from the signature by performing a cleanup process on the signature using the clean profile selected by the cleanup profile classifying engine.

6. The signature verification platform according to claim 5, wherein the parameter profile generating section inputs a combination of a locale ID indicative of the style decided by the locale classifying engine and a clean profile ID indicative of the clean profile selected by the cleanup profile classifying engine to a machine learning-based system, which has beforehand learned combinations of the locale IDs indicative of the styles of signatures and the clean profile IDs indicative of the clean profiles as well as verification profiles which suit the combinations, and based on a score of each of the verification profiles output from the machine leaning-based system, selects the verification profile.

7. The signature verification platform according to claim 1, wherein the signature is a static signature; and
    the parameter profile generating section inputs a locale ID indicative of the style decided by the locale classifying engine to a machine learning-based system, which has beforehand learned the locale IDs indicative of the styles of signatures and the verification profiles which suit the locale IDs, and based on a score of each of the verification profiles output from the machine leaning-based system, selects the verification profile.

* * * * *